(12) United States Patent
Burkum

(10) Patent No.: US 7,768,704 B2
(45) Date of Patent: Aug. 3, 2010

(54) SCREEN

(75) Inventor: Philip S. Burkum, Corvallis, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 798 days.

(21) Appl. No.: 11/551,225

(22) Filed: Oct. 19, 2006

(65) Prior Publication Data

US 2008/0094705 A1 Apr. 24, 2008

(51) Int. Cl.
*G03B 21/60* (2006.01)
(52) U.S. Cl. .................................................... 359/459
(58) Field of Classification Search ................ 359/443, 359/445, 459; 160/16; 362/342; 11/443, 11/445, 459
See application file for complete search history.

(56) References Cited

U.S. PATENT DOCUMENTS

| | | | |
|---|---|---|---|
| 1,122,192 A | 12/1914 | Clark | |
| 1,279,262 A | 9/1918 | Clark | |
| 1,610,423 A | 12/1926 | Cawley | |
| 1,852,858 A * | 4/1932 | Raven | 359/445 |
| 1,880,279 A * | 10/1932 | Raven | 359/445 |
| 1,922,636 A * | 8/1933 | Raven | 359/445 |
| 1,949,487 A * | 3/1934 | Raven | 359/445 |
| 2,828,667 A * | 4/1958 | Grossman | 359/459 |
| 2,974,709 A | 3/1961 | Gretener | |
| 3,260,156 A | 7/1966 | Komitor | |
| 3,442,508 A * | 5/1969 | Rudas | 472/75 |
| 5,837,346 A | 11/1998 | Langille et al. | |
| 6,040,941 A * | 3/2000 | Miwa et al. | 359/443 |
| 6,574,041 B1 * | 6/2003 | Chen | 359/459 |
| 6,600,600 B2 | 7/2003 | Chen | |
| 2003/0197932 A1 | 10/2003 | Sinkoff | |
| 2005/0248843 A1 * | 11/2005 | Maruta et al. | 359/459 |
| 2007/0146876 A1 | 6/2007 | Peterson et al. | |

OTHER PUBLICATIONS

Patent application titled "Microlens Front Projection Screen" (file# IFC 0503).
Patent application titled "Microlens Front Projection Screen" (file# IFC0503P).

* cited by examiner

*Primary Examiner*—Christopher E Mahoney
*Assistant Examiner*—Leon W Rhodes

(57) ABSTRACT

A method and apparatus relating to a projection screen having a reflective face including gills are disclosed.

20 Claims, 7 Drawing Sheets

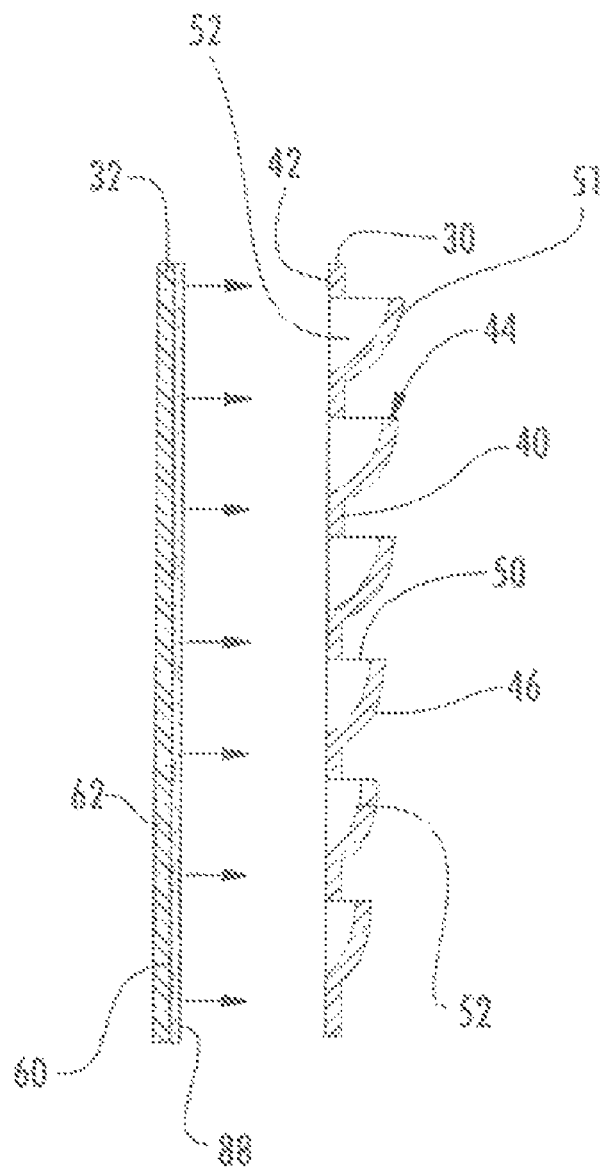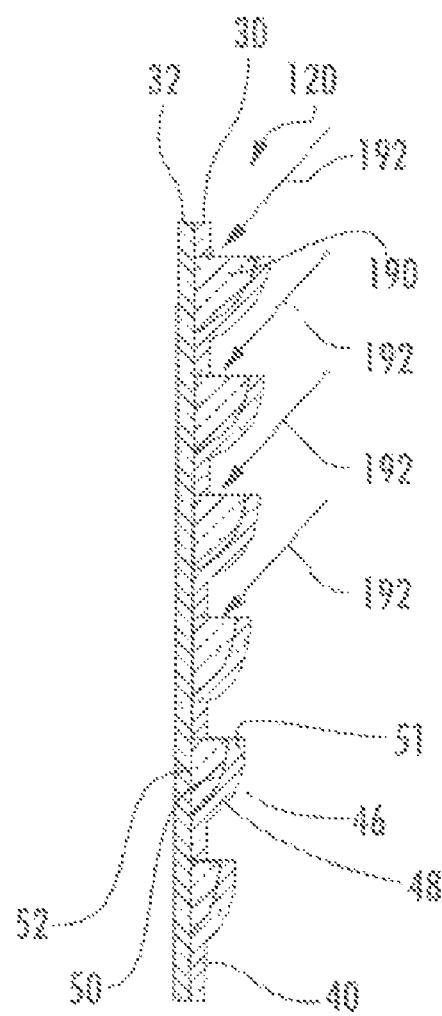
FIG. 5
FIG. 6

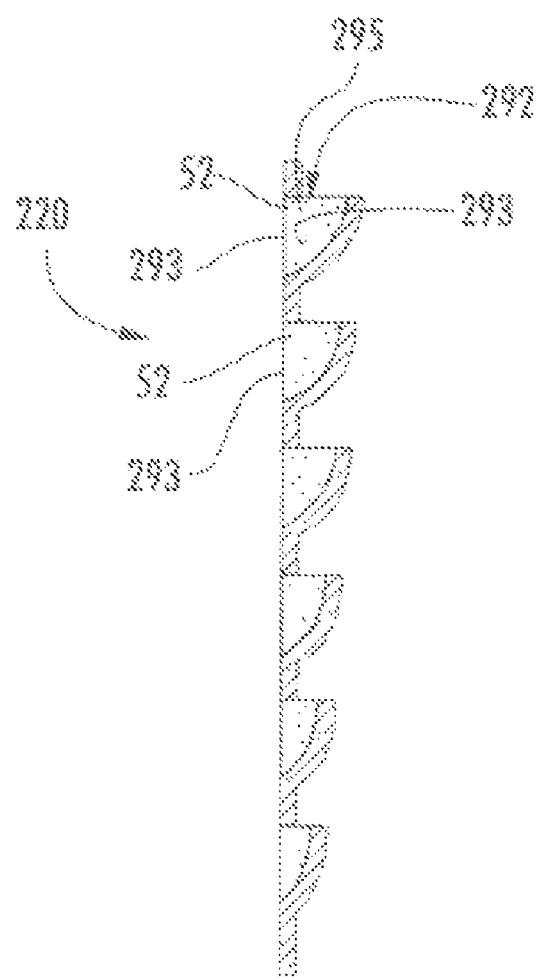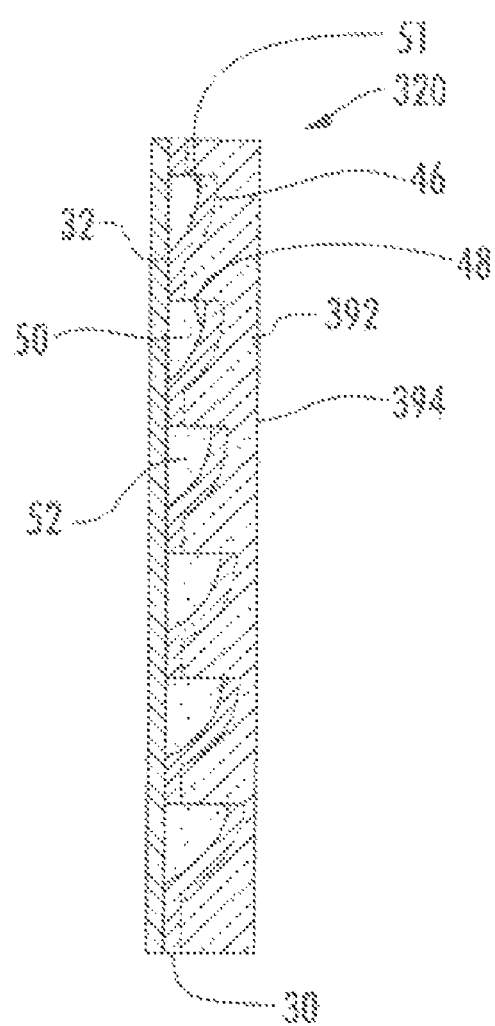

SCREEN

BACKGROUND

Many display systems project and reflect images off of a screen. Ambient light that is also reflected off the screen may reduce image contrast.

BRIEF DESCRIPTION OF THE DRAWINGS

FIG. 5 is a sectional view illustrating the film of FIG. 4 being joined to a backing film according to an example embodiment.

FIG. 6 is a sectional view of another embodiment of the projection screen of FIG. 1 according to an example embodiment.

FIG. 7 is a sectional view of another embodiment of the projection screen of FIG. 1 according to an example embodiment.

FIG. 8 is a sectional view of another embodiment of the projection screen of FIG. 1 according to an example embodiment.

DETAILED DESCRIPTION OF THE EXAMPLE EMBODIMENTS

Figure 1:
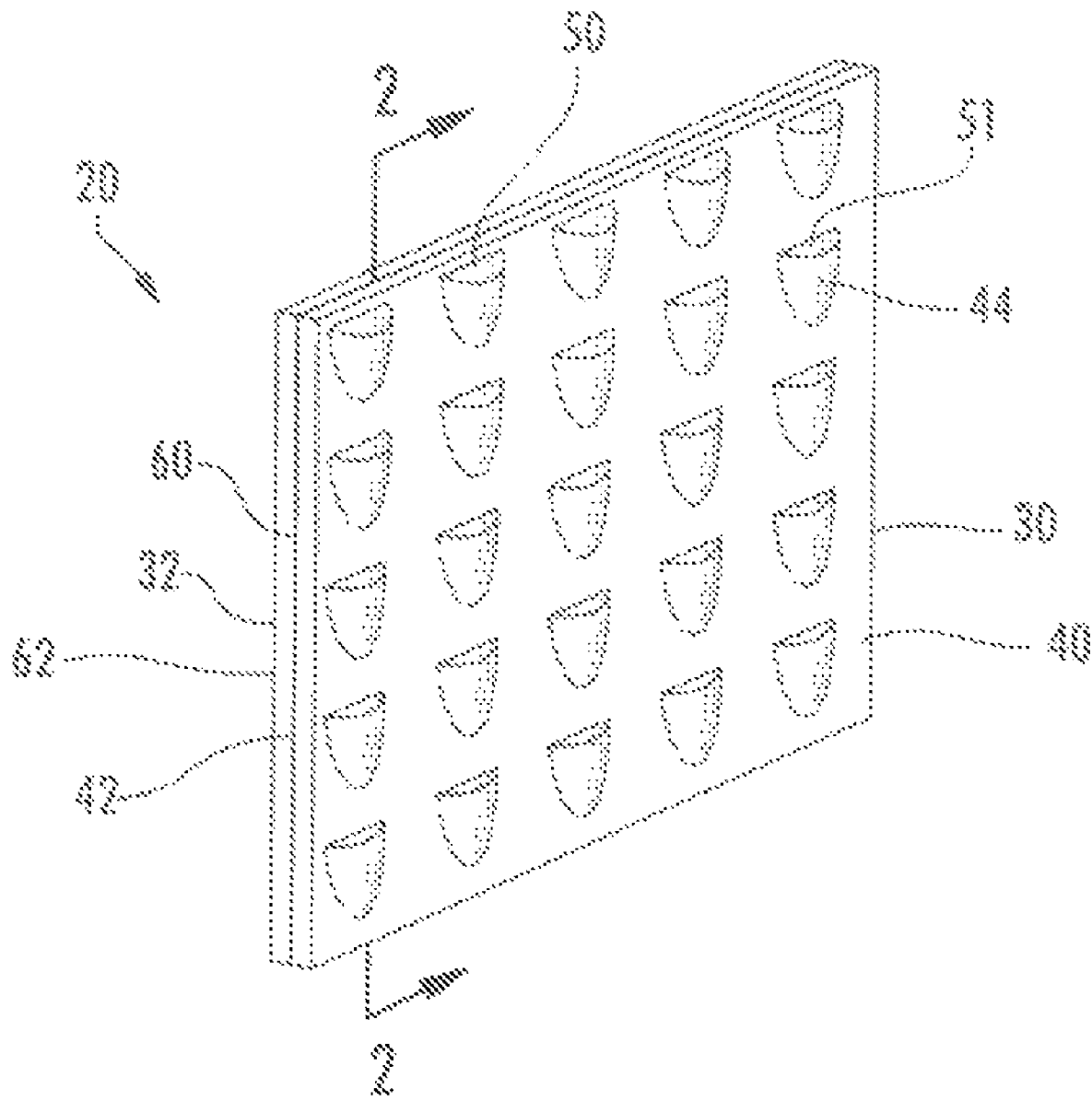
FIG. 1 is a front perspective view of a projection screen according to one example embodiment.
Figure 2:
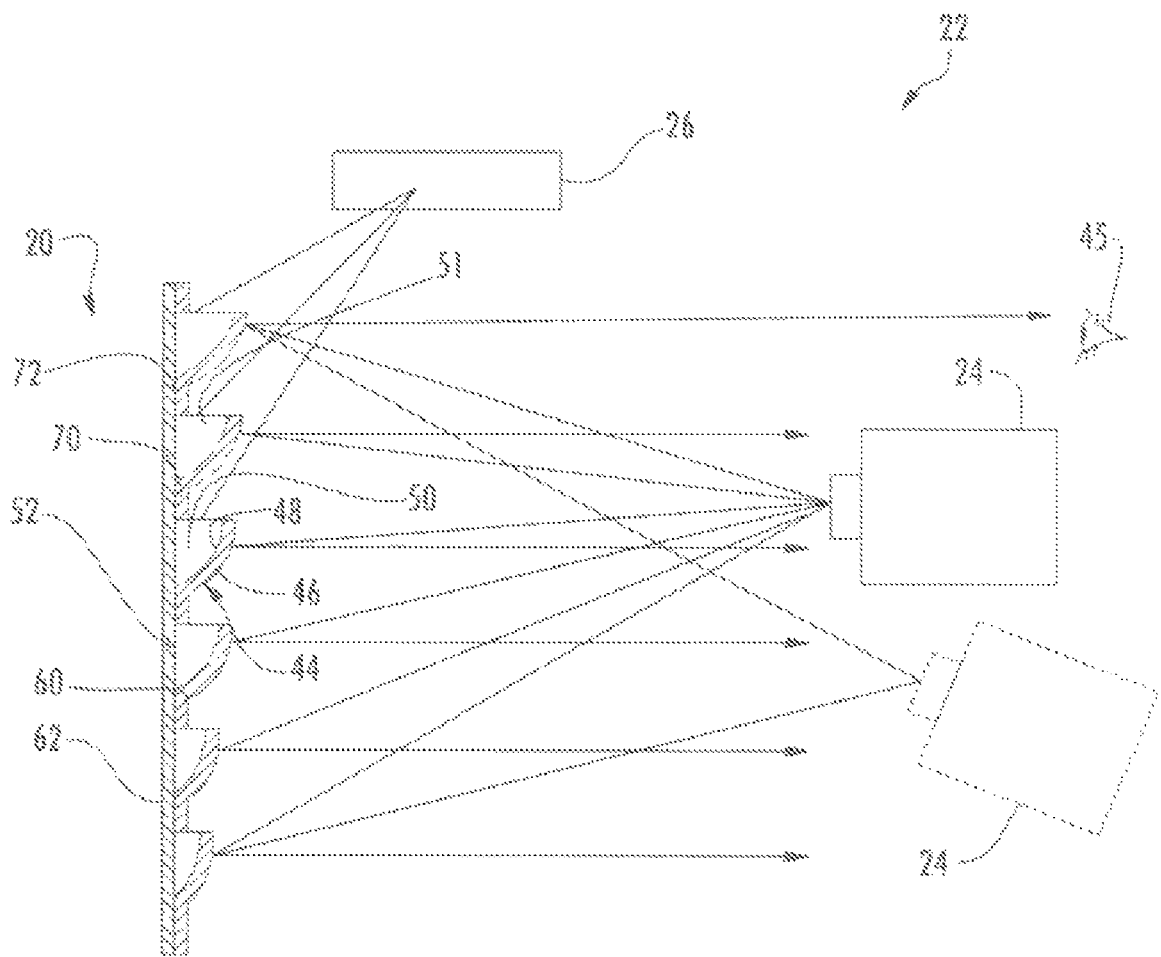
FIG. 2 is a sectional view of the screen of FIG. 1 taken along line 2-2 as part of a projection system according to an example embodiment.

FIGS. 1 and 2 illustrate projection screen 20 according to one example embodiment. FIG. 1 is a perspective view of screen 20. FIG. 2 is a sectional view of screen 20 utilized as part of a projection system 22 with projector 24 in an environment having one or more additional light sources 26, sometimes referred to as ambient light sources. As will be described hereafter, projection screen 20 provides an easily fabricated, low cost projection screen that reflects light from projector 24 while absorbing or attenuating light from light sources 26. As a result, projection screen 20 enhances contrast of images projected onto screen 20.

Screen 20 includes front film 30 and rear film 32. Front film 30 is an elongate sheet, web, band or other expansive area of one or more materials having a front face 40, a rear face 42 and a multitude or an array of gills 44. Front face 40 is configured to reflect light, such as visible light, back towards an observer 45 (schematically represented by an eye in FIG. 2). In the example embodiment illustrated, front face 40 is configured to diffusively reflect visible light. In one embodiment, front face 40 is a white lambertion reflective surface. In other embodiments, face 40 may comprise other reflective surfaces. In one embodiment, the reflective surface of front face 40 comprises an external surface of film 30. In other embodiments, the reflective surface of front face 40 may be located behind one or more additional layers of transparent material. Front face 40 generally extends between gills 44 and is substantially flat or planar. In other embodiments, front face 40 may be bowed or angled or have concave curvature, opposite to the convex gill curvature.

Rear face 42 comprises a surface generally opposite to front face 40 of film 30. In one embodiment, rear face 42 is configured to be adhered or otherwise coupled to film 32. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

In one embodiment, film 30 has a substantially uniform thickness such that face 42 parallels face 40. In other embodiments, film 30 may have a non-uniform thickness, wherein face 42 may be spaced from face 40 by differing extents across film 30. For example, in one embodiment, side portions of film 30 may be provided with a greater thickness such that front face and 40 is bowed inwardly about a vertical center line of front face 40.

As shown by FIG. 1, gills 44 extend across a majority, if not substantially all, of projection screen 20. The term "gill" is used to provide a pictorial representation of a mechanical feature in a reader's mind and to simplify description. For purposes of this disclosure, the term "gill" shall mean a structure having a mouth and an interior, wherein the mouth opens in a first direction along a first axis and wherein the interior is closed or bound in a second opposite direction along the first axis and is closed or bound in both directions along a second axis transverse to the first axis. Examples of a "gill" include, but are not limited to, a semi-conical structure, a semi-frust-conical structure of a flap having closed sides. In the example shown by FIG. 2, each gill 44 comprises a semi-conical structure extending along face 40. Each gill 44 has an outer or front surface 46 and an interior surface 48. Surfaces 46 face forward and have a first visible light reflectivity while an interior surfaces 48 face in a general rearward direction (towards film 32) and have a second lesser visible light reflectivity (greater visible light absorptivity). In one embodiment, surfaces 46 have the same level of reflectivity as face 40. In one embodiment, surfaces 46 diffusively reflect light and have a substantially white color.

In one embodiment, interior surfaces 48 substantially absorb light. In one embodiment, interior surfaces 48 have a darkened color, such as black. As a result, surfaces 46 reflect light from projector 24 as shown in FIG. 2 while interior surfaces 48 absorb light from other light sources, such as ambient light sources 26 to reduce degradation of the black point of screen 20 so as to enhance contrast of images reflected by screen 20.

As shown by FIG. 2, interior surfaces 48 of each gill 44 define an interior 50 and an opening or mouth 51 of each gill 44. Mouths 51 permit light to enter interiors 50 and be absorbed from particular angles while permitting surfaces 46 to reflect light incident upon screen 20 at other angles. In the particular example illustrated, screen 20 is configured to reflect light from a projector 24 in front of screen 20, wherein the projector is either slightly above, across from or below screen 20. At the same time, gills 44 are configured to receive light emitted from substantially overhead light sources within their interiors 50. In particular, mouths 51 of gills 44 face in an upward direction. In the embodiment illustrated, those gills 44 more proximate to light sources are larger than gills more distant light sources. In the particular example illustrated, upper gills 44 on-screen 20 are larger and project forwardly from face 40 to a greater extent. As a result, the larger mouths 51 of upper gills 44 are better able to receive or "catch" light from light sources 26 which generates a greater luminance near the top of the screen due to closer proximity and more normal incident angle. Capturing more light 26 near the top of the screen causes more uniform ambient light reflection across the screen, enabling a more uniform black point across the screen. In other embodiments, where light source may be to one side or below screen 20, gills along the one side or lower gills may be larger, respectively. In yet other embodiments, each of gills 44 along face 40 may have the same size mouths 51. In yet other embodiments, in lieu of each of gills 44 having mouths 51 facing in a common direction, upward, each of mouths 51 of each of gills 44 may face in an alternative direction, depending upon where projector 24 is located and where other sources of light not to be reflected are located. In particular embodiments, mouths 51 of gills 44 may face in different directions at different portions of screen 20. In other embodiments, in lieu of lower gills having larger mouths 51, other gills may alternatively have larger openings.

As shown by FIG. 1, surfaces 46 of gills 44 each have a generally rounded cross-sectional shape. As a result, screen 20 has a wider viewing range. In other embodiments, surfaces 46 of gills 44 may alternatively have two or more substantially planar sides facing in forward, angled or sideways directions.

According to one example embodiment, the largest dimension of each surface 46 of each gill 44 is less than or equal to the visual acuity of an observer. In one about, the largest dimension of each surface 46 of each gill 44 is less than or equal to about 100 μm's. As a result, images reflected from screen 20 avoid a speckled or grainy appearance. In other embodiments, the size of surfaces 46 and gills 44 may be larger depending upon the size of screen 20 and the distance between screen 20 and observers of images reflected off of screen 20.

According to one embodiment, surfaces 46 project forwardly of openings 52 which extend through film 30. Openings 52 are a result of one example method by which gills 44 are formed. Openings 52 permit light received by interiors 50 to pass-through to film 32. In other embodiments, gills 44 may alternatively be affixed or otherwise formed on the front film 30 which lacks such openings 52, wherein film 30 continues behind or rearward of surfaces 46. In such an alternative embodiment, those surfaces of film 32 behind gills 44 are configured to have a lower reflectivity as compared to surfaces 46. In particular embodiments, such surfaces may be configured to substantially absorb incident light. For example, such surfaces behind gills 44 and behind surfaces 46 may have a dark color or may be black.

Film 32 comprises one or more layers of one or more materials coupled to film 30 rearwardly or behind film 30. Film 32 has a front face 60 and a rear face 62. Front face 60 is coupled to rear face 42 of film 30. Front face 60 includes gill backing portions 70 and intermediate or peripheral portions 72. Gill backing portions 70 are those portions of front face 60 that extend behind gills 44 and extend across openings 52. Gill backing portions 70 have a lesser reflectivity than that of surfaces 46 of gills 44 and less than that of face 40 of film 32. In one embodiment, portions 70 are configured to substantially absorb visible light. In one embodiment, portions 70 have a dark color or are black. The dark-colored material or black material may extend along an exterior surface of front face 60 or may be coated upon film 32 with one or more overlying translucent or transparent layers. As shown by FIG. 2, light from light sources 26 that enters interiors 50 of gills 44 may pass through openings 52. Because portions 70 are configured to absorb visible light, such light that passes through openings 52 is absorbed rather than reflected back through openings 52 and out of gills 44. As a result, screen 20 better absorbs light that is not to be reflected, such as light from light sources 26 to better enhance contrast of light that is reflected from screen 20.

Portions 72 are those portions of face 60 that extend between gill backing portions 70 and along outermost edges of film 32 opposite to the outermost edges of film 30. In the particular example embodiment illustrated, each of portions 72 is configured to be individually fastened, bonded or adhered to rear face of 42 of film 32 between openings 52. As a result, in one embodiment where gills 44 are formed by stretching film 32, stretch-induced stresses of film 30 are evenly distributed across film 32, reducing likelihood of screen 20 buckling. For example, in one embodiment, an entirety of front fact 60 of film 32 may be coated with an adhesive or bonding material and placed against rear face 42 of film 30. In such an embodiment, the adhesive or bonding material may be transparent, overlying portions 70 which have a dark color or are black. In other embodiments, adhesive or bonding material may itself have a dark color or may be black such that an entirety of face 60, including portions 70 have a dark color or are black. In still other embodiments, an entirety of face 60 may have a dark color or may be black, wherein a transparent adhesive is coated over the face 60 and joins film 32 to film 30.

Although in the example embodiment illustrated, each of portions 72 is fastened or is adhered to opposite portions of film 30, in other embodiments, film 32 may alternatively be secured to film 30 only at selected multiple spaced opposing portions of film 30 and film 32 or only along a periphery of film 30. In those embodiments in which film 32 is joined to film 30 only along the periphery of film 30, film 32 may be continuously fastened or adhered to film 32 along the periphery or fastened or secured to film 32 at multiple spaced portions along a periphery of film 30. Examples of methods or connection elements by which one or more portions of film 32 may be joined to film 30 include, but are not limited to, stitching, stapling, riveting, adhesives, welding, melting or fusing adjacent materials, hook and loop fasteners and various other existing or future developed attachment methods or connection elements. In other embodiments, film 32 may be omitted.

Figure 3:
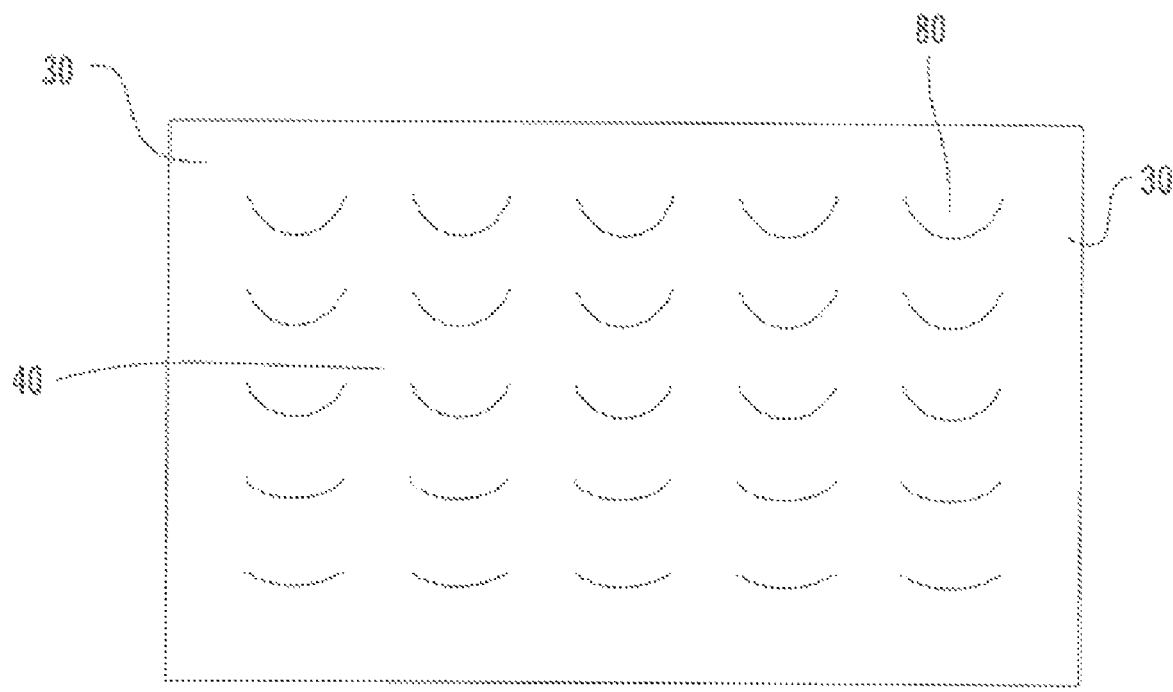
FIG. 3 is a front plan view of a slitted film of the projection screen of FIG. 1 according to an example embodiment.
Figure 4:
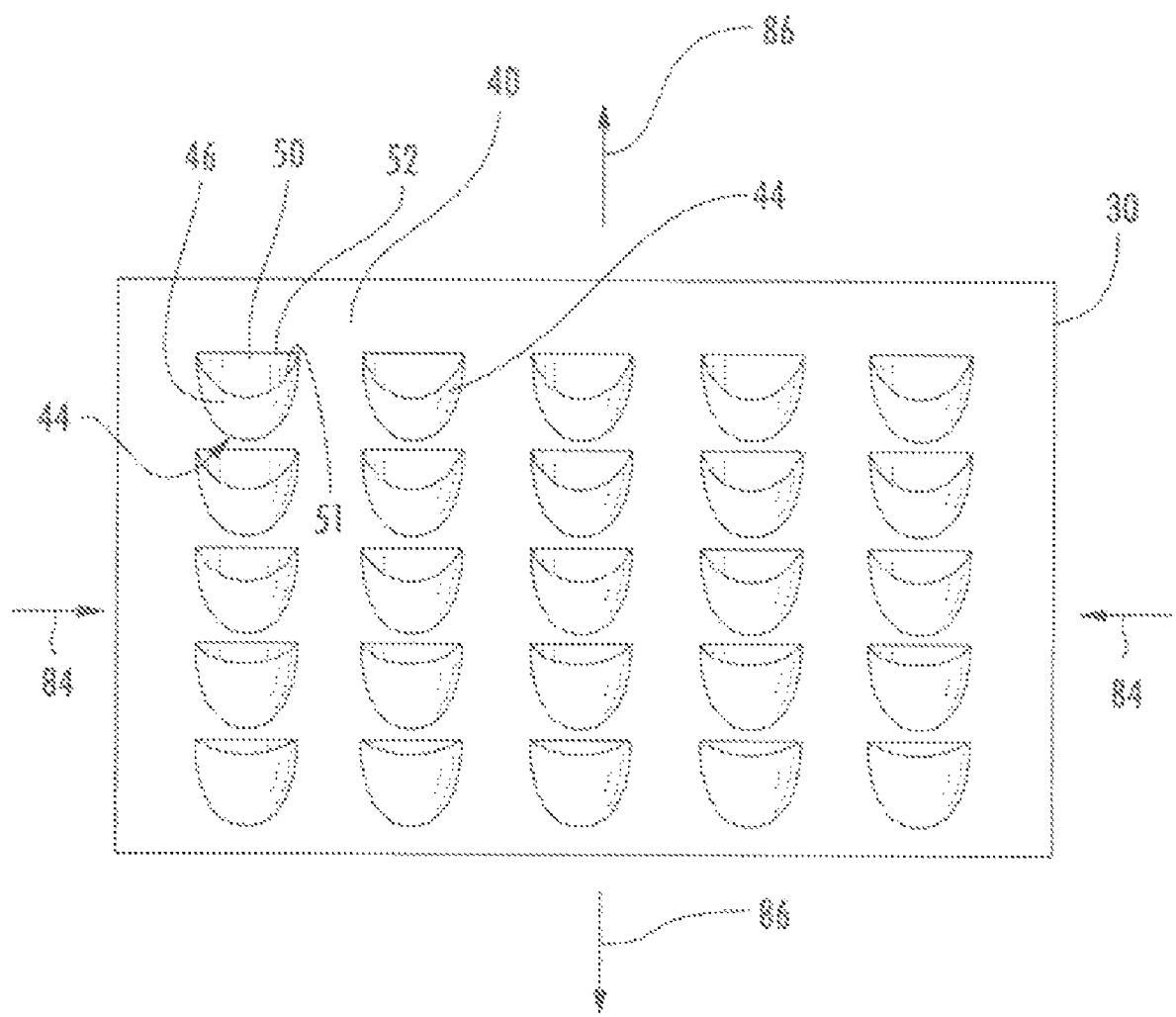
FIG. 4 is a front plan view illustrating forming of gills in the slitted film of FIG. 3 according to an example embodiment.

FIGS. 3-5 illustrate one example method of forming screen 20. According to one embodiment, film 30 is formed by treating or otherwise processing a base layer or layers so as to have desired reflective properties. The base layer or layers may be the thinnest film that may be reasonably handled on a long roll while controlling stretch of the material. In other embodiments, film 30 may be in sheet form. In particular embodiments, metal films may be employed to increase handling capability while minimizing thickness. The sheet length or roll length is longer than an ending width of screen 20 due to subsequent lateral contraction of the film as will be described hereafter. Examples materials from which the base layer or layers of film 30 may be formed include, but are not limited to, polyimide, polyethylene, silicone, Teflon (polytetrafluoroethylene), polyester, liquid crystal polymer, polysulfone. In other embodiments, other materials maybe utilized.

The base layer or layers of film 30 are treated to provide film 30 with desired reflective properties. In one embodiment the base layer or layers of film 30 may comprise a black material, wherein a white or other reflective material is scattered or otherwise applied or deposited on the base layer to provide face 40 and surfaces 46 with their higher level of reflectivity. The white reflective material scattered upon the black base layer may comprise any higher-strength plastics with colorants included in its resins. One example of such a white reflective material that may be applied to the base layer include, not limited to, titanium dioxide, calcium fluoride. In other embodiments, other reflective materials may be employed. Alternatively, in those embodiments in which the base layer comprises a film of one or more metals, various anodizing methods may be used to develop desired absorption of or reflective properties on each side of film 30. In yet other embodiments, other passivation, anodizing, coating or lamination processes may be employed to provide face 40 of film 30 with a higher level of reflectivity or a lower level of light absorptivity as compared to face 42.

As shown in FIG. 3, a multitude of elongate slits 80 are formed in film 30. Slits 80 have a shape that defines the shape of gills 44. In one embodiment, each of slits 80 is arcuate such that each of gills 44 as a semi-conical shape having a semi-circular or semi ovular cross-sectional shape. In other embodiments, slits 80 may have other shapes, providing gills 44 with other shapes.

According to one example embodiment, slits 80 are formed in film 30 by stamping or by using a laser to cut into film 30. Because slits 80 may be formed in a separate material-preparation process, slit film 30 may be stored in sheets or on a roll prior to further processing of film 30 to form screen 20. Alternatively, slits 80 may be formed just prior to completion of screen 20. In other embodiments, slits 80 may be formed with other methods or in other fashions.

As shown in FIG. 4, slits 80 are opened to form gills 44. According to one embodiment, film 30 is contracted in the directions indicated by arrows 84 such that surfaces 46 project forwardly from face 42 to open gills 44 to form interiors 50 and openings 52. According to one embodiment, contraction of film 30 is achieved by stretching film 30 in the direction indicated by arrows 86. In one embodiment in which slitted patterned film 30 is fed from a roll, film 30 is stretched a controlled amount before being secured to film 32 as shown in FIG. 5. In other embodiments, stretching of film 30 to laterally contract film 30 may be performed by stretching film 30 over a roller, wherein gills 44 open away from the roller. Material elongation and lateral contraction may be controlled to achieve a desired gill shape, opening angle, material stress and final screen width. For full-sheet processing, elongation may be controlled by gripping a sheet around the edges and controlling movement of the material with a series of grippers (not shown). For roll-to-roll processing, elongation may be controlled by adjusting a speed at which the slitted film 30 is fed relative to a take-up speed, wherein the take-up speed is faster than the feed speed. Grippers, rollers or guides may additionally be used to force uniform contraction in zones where film 30 is to be attached to film 32 as seen in FIG. 5.

In other embodiments, gills 44 may be opened in other fashions. For example, gills 44 may alternatively be opened by blowing a gas or other fluid across or through the slitted film 30, creating an opening pressure. In still other embodiments, gills 44 may be opened by contacting face 60 of slitted film 30 with a roller or other surface including a multitude of bumps, protrusions, projections, fingers or the like, wherein the fingers, bumps, protrusions and the like engage film 30 between opposite sides of each slits 80. In yet other embodiments, a vacuum may be applied to face 40, causing gills 44 to open.

As shown in FIG. 5, film 32 is coupled to film 30. The film 32 is configured to resist compression and buckling from film 30. Properties such as the weight of film 32, flexibility, strength, flatness and stress resulting from the stretching or contraction of film 30 may be traded off is such stress may not be relieved during fabrication of screen 20. In one embodiment, film 32 is prepared by applying a black or transparent adhesive 88 across an entire surface area of face 60 to attach film 32 to film 30. Alternatively, adhesive may be applied at a perimeter of face 60 to attach film 30 to film 32 only at edges of film 30. As shown by FIG. 5, film 32 is joining to film 30. In one embodiment, both film 30 and film 32 are provided in rolls, where in film 30 is stretched to open gills 44 in wherein film 32 is unrolled with adhesive 88 brought into contact with face 42 of film 32 assist in maintaining gills 44 in an open state and to distribute stretch-induced stresses evenly across film 32.

Reducing stress in film 30 resulting from the formation of gills 44 stabilizes gills 44 and reduces the likelihood of buckling screen 20 after assembly. As a result, the shape of gills 44 is less likely to change because of such stresses. In particular embodiments, such internal stresses may further be relieved by a forming film 30 from one or more materials such that internal stresses of film 30 may be relieved by heating screen 20, after film 32 and film 30 are joined one another, to a temperature beyond a glass transition temperature of the film 30. Examples of such materials from which film 30 may be formed, permitting stress reduction through subsequent heating of film 30 include polyimide, polyethylene, silicone, Teflon, polyester, liquid crystal polymer, polysulfone. In other embodiments, other materials may be employed for film 32 such as polymer, fabric, metal, paper.

Although screen 20 is illustrated as including film 30 and film 32, screen 20 may additionally include other components or additional layers. For example, screen 20 may be mounted to a rigid frame or surface, or packaged similar to a rollable screen by attaching curved cables, lower-edge rods/weights, rolling mechanisms, screen flattening elements or other presently existing or future developed features. Overall, screen 20 provides a front projection screen having low production costs relative to its contrast-enhancing abilities. Screen 20 may be formed from low-cost materials and utilizes low-cost two-dimensional fabrication processes. Although screen 20 is the described as being formed by the above noted processes, in other embodiments, screen 20 may be formed using other fabrication methods.

FIG. 6 illustrates screen 120, another embodiment of screen 20. Screen 120 may be used as part of projection system 22 in lieu of screen 20. Screen 120 is similar to screen 20 except that screen 120 additionally includes gill fillers 190. Gill fillers 190 comprise material or structures deposited within interiors 50 of one or more of gills 44. Gill fillers 190 stabilize gills 44.

In one embodiment, gill fillers 190 comprise a mass of material substantially filling an entirety of each interior 50. In one embodiments, the mass of material is inserted into interiors 50 while in a liquid state, wherein the material solidifies or hardens within interiors 50. In such an embodiment, gill fillers 190 may comprise a material or materials that readily wet surfaces 48 or gills 44. Gill fillers 190 may be deposited into interiors 50 using vapor deposition, directional spraying (as indicated by arrows 192), dunking film 30 within the material of fillers 190 or flowing the material of fillers 190 into interiors 50.

Gill fillers 190 each comprise an optically transparent material which substantially fills interiors 50 to stabilize gills 44. Because such gill fillers 190 substantially fill interiors 50, fillers 190 prevent or inhibit environmental contaminants, such as dust, from becoming trapped in interiors 50 to improve the cleanability of screen 20. Gill fillers 190 also increase the thickness of film 30 such that stresses are distributed into a thicker film. At the same time, the optically transparent material of gill fillers 190 permits visible light to be captured within interiors 50 and to be absorbed by surfaces 48 and portions 70 of films 30 and 32, respectively. In other embodiments, gill fillers 190 may have a dark light absorbing color or black such that incident light upon gill fillers 190 is absorbed. In such an embodiment, surfaces 48 and 70 may be formed from other materials since their reflectivity is not relevant in such an embodiment.

Although FIG. 6 illustrates gill fillers 190 as being inserted into interiors 50 after film 30 has been joined to film 32, in other embodiments, gill fillers 190 may be provided in interiors 50 prior to the joining of film 30 to film 32. In one embodiment, the volume and optical characteristics of an adhesive used to join films 30 and 32 could be used as the gill filler material. The adhesive would flow into interior 50 through wetting forces and/or through gravitational or mechanical force. In other embodiments, gill fillers 190 may be inserted into interiors 50, wherein film 32 is omitted. For example, FIG. 7 is a sectional view illustrating screen 220, another embodiment of screen 120. Screen 220 is similar to screen 120 except that screen 220 omits film 32 and includes gill fillers 290. Gill fillers 290 are similar to gill fillers 190 except that gill fillers 290 include a first layer or layers 293 of gill filling material having a color, such as a dark color or black. Thereafter, a remainder of interior 50 is filled with an optically transparent gill filling material 295. As shown by FIG. 7, surfaces 48 of gills 44 may additionally be coated with the first light absorbing gill filling material that fills openings 52, wherein an optically transparent gill filling material fills a remainder of interiors 50. In other embodiment, gill fillers 190 or 290 may only partially fill interiors 50 of gills 44.

FIG. 8 is a sectional view illustrating projection screen 320, another embodiment of projection screen 20. Projection screen 320 may utilized as part of projection system 22 in lieu of projection screen 20. Projection screen 320 is similar to projection screen 20 except that projection screen 320 additionally includes planarizing layer 392. Layer 392 comprises a layer of optically transparent material or materials extending over and across film 30 and over and across gills 44. Layer 392 provides screen 320 with a generally planar or flat frontward most surface 394. Layer 392 additionally fills interiors 50 of gills 44 and fills openings 52 behind each of gills 44. Because layer 392 is formed from a transparent material, layer 392 permits visible light to pass through layer 392 and to either be reflected off of face 40 or surfaces 46 of gills 44 or to pass into interiors 50 where such light is substantially absorbed by surfaces 48 and portion 70 of film 32 depending upon the angle of incidence of such light with screen 320. At the same time, layer 392 stabilizes gills 44, distributes stresses in film 30 across a thicker total film and keeps environmental contaminants, such as dust, from becoming trapped in interiors 50 of gills 44 or between gills 44 along face 40. In one embodiment, layer 392 may be formed from a transparent optical adhesive or coating, designed to couple light into the film. In other embodiments, layer 392 may be formed from other transparent materials.

Figure 9:
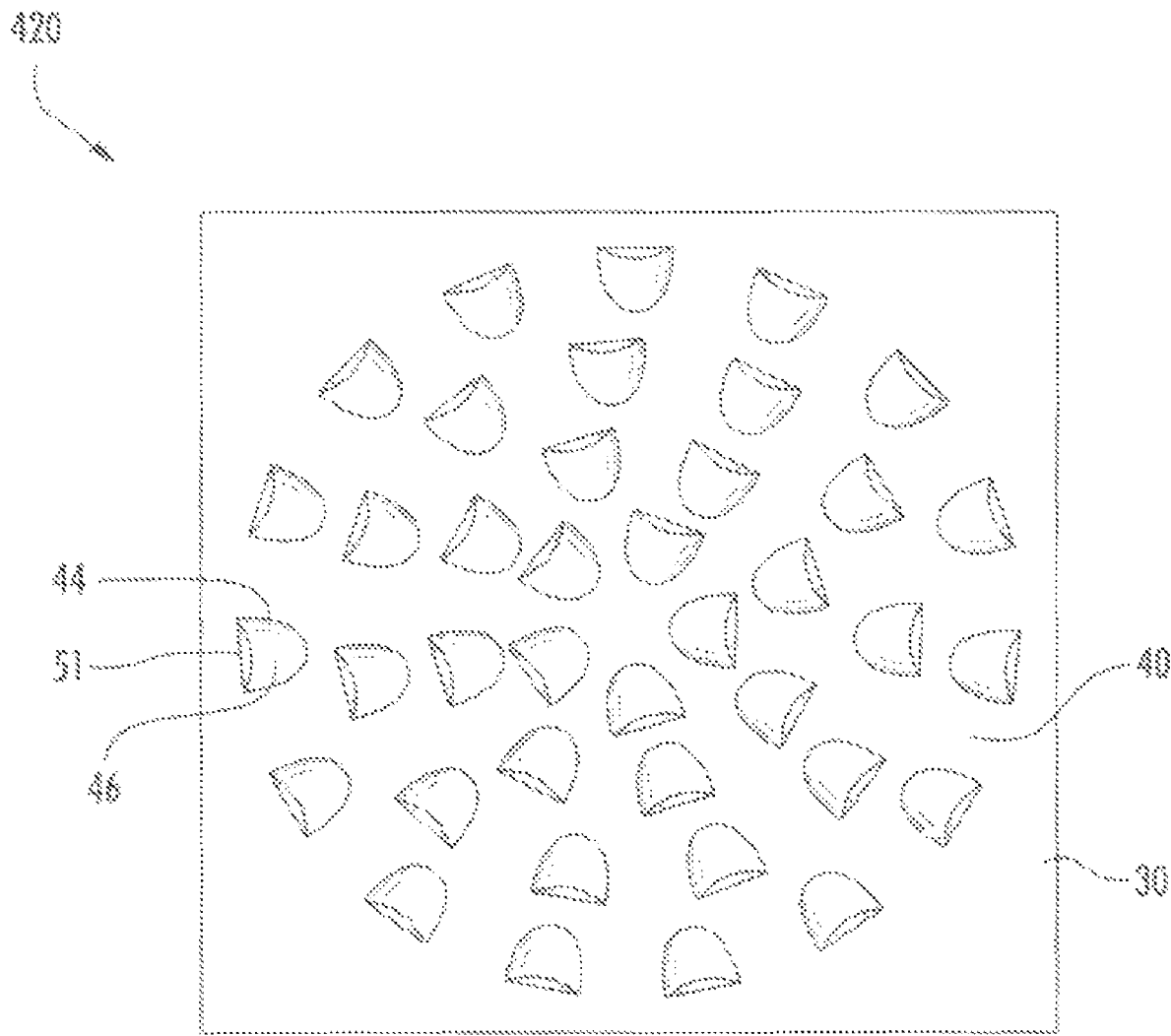
FIG. 9 is a front plan view of another embodiment of the projection screen of FIG. 1 according to an example embodiment.

FIG. 9 is a front plan view of projection screen 420, another embodiment of screen 20. Projection screen 420 is similar to projection screen 20 except that projection screen 420 includes gills 44 arranged in a radial pattern to match radial light distribution from projector 24 (shown in FIG. 2). In particular, gills 44 of screen 420 are arranged such that interiors 50 of each of gills 44 face in a direction radially outward from a projection center of screen 420. As a result, ambient light or light from sources other than projector 24 originating at multiple locations, especially highly scattered ambient light, embodiment screen 420 is better absorbed by gills 44. Consequently, like projection screens 20, 120, 220 and 320, screen 420 reduces degradation of the black point of the screen from such ambient light to enhance contrast of the image projected by projector 24 and reflected off of the screen.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a projection screen comprising:
a film having a first reflective face;
gills formed in and projecting from the first face, wherein an inside of each gill is configured to absorb light; and
at least one solid material at least partially filling the inside of each gill on the first face.

2. The apparatus of claim 1 further comprising a second film, the second film having a light absorbing face adjacent a second opposite face of the first film.

3. The apparatus of claim 2, wherein the second film is attached to the second face of the first film at a plurality of locations between opposite edges of the first film.

4. The apparatus of claim 3, wherein the second film is attached across substantially an entire surface area of the second face between the gills.

5. The apparatus of claim 1, wherein the least one solid material comprises a transparent material at least partially filling the inside of each gill on the first face.

6. The apparatus of claim 5, wherein the transparent material has a substantially uniform planar surface across the first face of the first film.

7. The apparatus of claim 1, wherein the gills are arranged in a radial pattern, wherein the gills include a set of gills collectively extending 360 degrees around a point on the first face, each gill of the set of gills having a mouth facing in a direction radially outward from the point.

8. The apparatus of claim 1, wherein the gills have semi-ovular or semi-circular openings.

9. The apparatus of claim 1, wherein the gills have openings facing in a longitudinal direction, wherein the film is held in a stretched state in the longitudinal direction and is held in a contracted state in a lateral direction.

10. The apparatus of claim 1, wherein the gills include a first set of gills having first sized openings and a second set of gills having second larger sized openings.

11. The apparatus of claim 1, wherein the gills have openings facing in an upward direction.

12. The apparatus of claim 1, wherein the first film has a light absorbing second face.

13. The apparatus of claim 1 further comprising a projector configured to project an image onto the screen.

14. The apparatus of claim 1, wherein the at least one solid material has a dark light absorbing color.

15. The apparatus of claim 1, further comprising a second film, the second film having a light absorbing face adjacent a second opposite face of the first film wherein the at least one solid material is an adhesive joining the first film and the second film, the adhesive at least partially filling the inside of each gill.

16. The apparatus of claim 1, wherein the least one solid trail fills the inside of each gill on the first face.

17. An apparatus comprising:
a projection screen comprising:
a film having a first reflective face;
gills formed in and projecting from the first face, wherein an inside of each gill is configured to absorb light; and
a transparent material at least partially filling the inside of each gill on the first face, wherein the transparent material has a substantially uniform planar surface across the first face of the first film.

18. An apparatus comprising:
a projection screen comprising:
a film having a first reflective face; and
gills formed in and projecting from the first face, wherein an inside of each gill is configured to absorb light, wherein the gills include a set of gills collectively extending 360 degrees around a point on the first face, each gill of the set of gills having a mouth facing in a direction radially outward from the point.

19. The apparatus of claim 18, wherein the set of gills include a first number of gills at a first radial distance from the point and a second number of gills greater than the first number at a second radial distance from the point greater than the first radial distance.

20. The apparatus of claim 18, wherein the set of gills are circumferentially staggered about the point.

* * * * *